June 5, 1956 G. C. LE COCQ 2,748,555
FRUIT PICKING DEVICE
Filed March 11, 1954
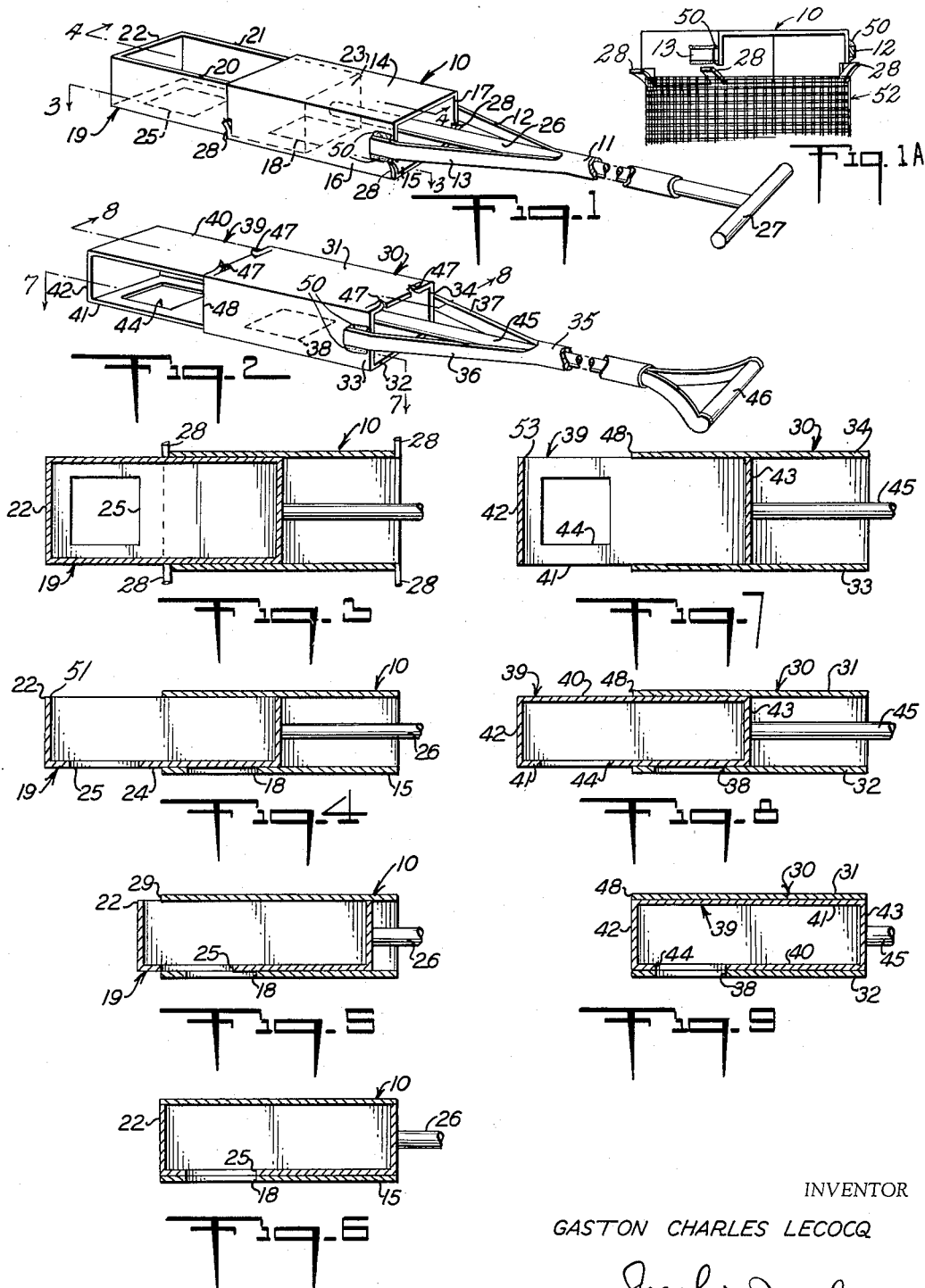
INVENTOR
GASTON CHARLES LECOCQ
BY Jacobi & Jacobi
ATTORNEY United States Patent Office 2,748,555
Patented June 5, 1956

2,748,555

FRUIT PICKING DEVICE

Gaston C. Le Cocq, New Orleans, La.

Application March 11, 1954, Serial No. 415,603

9 Claims. (Cl. 56—338)

This invention relates to harvesting and more particularly to a device for facilitating the harvesting of berries, fruit and the like, with the berries or fruit disposed in close proximity to the ground or in an elevated position and allowing the user to maintain a comfortable upright position and to automatically deposit the severed fruit into a bag or other suitable container.

Heretofore, numerous devices of this nature have been proposed, but many of these have been relatively large, heavy and cumbersome and have also included relatively complex mechanism which frequently failed by reason of breakage or improper adjustment. Furthermore, these prior art harvesting devices very frequently damaged the fruit, either by crushing the same or by inflicting bruises which were sufficient to render the fruit useless. As is well known, it is extremely fatiguing for a person to utilize a device attached to the end of a relatively long pole or handle, particularly when the same is in an elevated position to harvest fruit located above the person's head and consequently, these prior art devices which were relatively heavy found little favor.

It is accordingly an object of this invention to provide a harvesting device incorporating only two movable parts and susceptible of extremely lightweight construction.

A further object of the invention is the provision of a harvesting device in which damage to the fruit being harvested is substantially avoided.

A still further object of the invention is the provision of a harvesting device in which means is provided for conveniently attaching a bag or other container to receive the severed fruit.

Another object of the invention is the provision of a harvesting device which does not require precise adjustment of the relatively movable parts and consequently may be utilized by relatively unskilled personnel without danger of failure due to misadjustment or breakage.

A further object of the invention is the provision of a harvesting device which may receive fruit from the upper side thereof, sever the same and drop such fruit into a bag or other container suspended below the device.

A still further object of the invention is the provision of a harvesting device which may receive fruit from either side thereof, sever the same and drop such fruit into a bag or container suspended below the device.

Another object of the invention is the provision of a harvesting device which may be economically manufactured from readily available materials thus providing a device which may be readily sold in a highly competitive market.

Further objects and advantages of the invention will be apparent from the following description taken in conjunction with the accompanying drawing wherein:

Fig. 1 is a view in perspective of one form of the harvesting apparatus constructed in accordance with this invention;

Fig. 1A, a perspective rear end view showing the hollow body of the apparatus with a harvesting bag suspended therefrom;

Fig. 2, a view in perspective of a modified form of the harvesting device of this invention;

Fig. 3, a horizontal, longitudinal, sectional view of the harvesting device taken substantially on the line 3—3 of Fig. 1;

Figure 4, a sectional view, taken substantially on the line 4—4 of Fig. 1;

Figs. 5 and 6, sectional views, similar to Fig. 4, and showing the apparatus in partialy cosed and fully closed positions, respectively;

Fig. 7, a horizontal, longitudinal sectional view of the modified form of the harvesting device taken substantially on the line 7—7 of Fig. 2;

Fig. 8, a sectional view, taken substantially on the line 8—8 of Fig. 2; and

Fig. 9, a sectional view, similar to Fig. 8, and showing the apparatus in fully closed position.

With continued reference to the drawing the harvesting device of this invention may well comprise an elongated generally rectangular, hollow body 10 open at both ends and which may be provided with an elongated, tubular handle 11 having a bifurcated end with the legs 12 and 13 secured to the body 10 by any suitable means such as welding 50 or the like. The body 10 may include top and bottom walls 14 and 15 respectfully and side walls 16 and 17 respectfully. Top wall 14 and side walls 16 and 17 are imperforate while bottom wall 15 is provided with an aperture 18 adjacent one end thereof. This aperture 18 may be rectangular in shape, as shown, or may be of any other desired configuration.

Slidably disposed within the body 10 is a plunger 19 which may be comprised of side walls 20 and 21, end walls 22 and 23 and a bottom wall 24. The bottom wall 24 may be provided with an aperture 25 which is similar in size and configuration to the aperture 18 in the bottom wall 15 of the body 10. The purpose and operation of these two apertures 18 and 25 will be presently described. It is to be noted that the plunger 19 is open at the top.

Secured to the end wall 23 of plunger 19 is an actuating rod 26 which extends longitudinally thereof, and is slidably received in the tubular handle 11. The actuating rod 26 projects beyond the outer end of tubular handle 11 and is provided with a cross member 27 which may be conveniently grasped in the hand of the operator.

The side walls 16 and 17 of the body 10 may be provided with struckout tabs 28 adjacent each end thereof and it is to be noted, that these tabs project upwardly and are adapted to receive the upper edge of a bag or other container or a flexible suspending means for such container, such as a string or the like, and in this fashion the bag 52 or container is suspended below the body 10 and with the opening or aperture 18 in the body 10 in communication with the interior of the bag or container.

In operation, the tubular handle 11 is grasped in one hand of the operator and the cross member 27 of the actuating rod 26 in the other hand and the cross member 27 moved toward the handle 11 to project the plunger 19 outwardly of the body 10, as shown in Figs. 1, 3 and 4 of the drawing. With the parts in this position the harvesting device is manipulated until a berry or other fruit is received within the confines of the plunger 19, such fruit entering the plunger through the open upper side thereof. At this time, the cross member 27 is moved outwardly of the handle 11, thus drawing the plunger 19 within the body 10 and as the outer end wall 22 of the plunger 19 moves within the body 10, the upper edge 51 of the end wall 22 will cooperate with the edge 29 of the top wall 14 of the body 10 to sever the stem of the berry or other fruit and thus allow such berry or fruit to drop through the aperture 25 of the punger 19 which is now in registration with the aperture 18 in the bottom wall 15 of the body 10, as shown in Fig. 6, and into the bar or other container suspended from the tabs or prongs 28.

This operation is completed as often as necessary and it will be seen that the device may be utilized by a person in a standing position or if the fruit to be harvested is at an elevated position, the same may be raised over the head and since the entire structure may be made of extremely lightweight material, such as aluminum or the like, the device is relatively easy to use without causing undue fatigue, and since there are only two moving parts, wear and breakage is greatly minimized and there are no critical adjustments to be maintained. Furthermore, this device will cleanly sever the stem of the fruit without in any way damaging or bruising such fruit. The container or bag, of course, may be conveniently removed when filled by merely lifting the same off of the tabs or prongs 28.

A modified form of the invention is shown in Fig. 2 and this may well comprise an elongated hollow body 30 substantially rectangular in cross section and being formed by top and bottom walls 31 and 32 respectfully, and by side walls 33 and 34 respectfully. A tubular handle member 35 may be bifurcated at one end and the legs 36 and 37 thereof secured to the body 30 in any suitable manner, such as by welding or the like. The bottom wall 32 of the body 30 is provided with an aperture 38 adjacent one end thereof, and this aperture may be rectangular in formation or any other desired configuration.

Slidably disposed within the body 30 is a plunger 39 which may be formed by top and bottom walls 40 and 41 respectfully, and by end walls 42 and 43 respectfully. The plunger 39 is open at both sides and the bottom wall 41 is provided with an aperture 44 of substantially the same size and configuration as the aperture 38 in the bottom wall 32 of the body 30

Secured to the end wall 43 of the plunger 39 is an actuating rod 45 and this rod is slidably received within the tubular handle 35 and terminates at the outer end thereof in a handle member 46, which may be conveniently utilized to reciprocate the rod 45 with relation to the tubular handle member 35.

In order to conveniently attach a bag 52 or other receptacle to the body 30 and to suspend the same beneath the aperture 38, the top wall 31 of the body 30 is provided with a plurality of struck out tabs or prongs 47 which may be utilized to engage the edge portion of the bag or other container and to releasably support the same on the body 30 with the interior of the bag communicating with the aperture 38.

The operation of this modified form of the harvesting device of this invention is similar to that described above, in connection with the form shown in Fig. 1, the only difference being, that the berry or other fruit may be inserted within the plunger 39 from either side thereof, and upon retracting the plunger 39 within the body 30, the edge 53 of the end wall 42 of the plunger 39 will cooperate with the edge 48 of the body 30 to sever the stem of the berry or other fruit and permit the same to drop through the registering apertures 44 and 38 and into the bag suspended below the body 30.

It will thus be seen, that either form of the invention provides a convenient device for harvesting berries or other fruit by severing the stems thereof and permitting such fruit to drop into a bag or other container carried by the device, and since the device is of extremely lightweight construction and involves only two movable parts, the same may be conveniently and easily manipulated without undue fatigue and the berries or other fruit may be harvested without bruising or other damage thereto.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A fruit harvesting device comprising an elongated hollow body substantially rectangular in cross section and open at both ends and having top, bottom and side walls, said top and side walls being imperforate and the bottom wall having an aperture adjacent the outer end thereof, an elongated tubular handle secured to the opposite end of said body, a hollow plunger slidably disposed in said body and comprising side, end and bottom walls, said plunger being open at the top, the bottom wall of said plunger having an aperture adjacent the outer end thereof, an actuating rod secured to the opposite end of said plunger and extending through said tubular handle, a cross bar on the free end of said actuating rod, tabs on said body and a receptacle detachably supported on said tabs below the aperture in said body whereby fruit may be disposed in said plunger through the open top thereof, and upon retraction of said plunger the edge of the outer end wall of said plunger will cooperate with an edge of said body to sever the stem of said fruit to permit the same to pass through said apertures into said receptacle.

2. A fruit harvesting device comprising an elongated hollow body substantially rectangular in cross section and open at both ends and having top, bottom and side walls, said top and side walls being imperforate and the bottom wall having an aperture adjacent the outer end thereof, an elongated tubular handle secured to the opposite end of said body, a hollow plunger slidably disposed in said body and comprising side, end and bottom walls, said plunger being open at the top, the bottom wall of said plunger having an aperture adjacent the outer end thereof, an actuating rod secured to the opposite end of said plunger and extending through said tubular handle, a cross bar on the free end of said actuating rod and means on said body for detachably supporting a receptacle below the aperture in said body whereby fruit may be disposed in said plunger through the open top thereof and upon retraction of said plunger the edge of the outer end wall of said plunger will cooperate with an edge of said body to sever the stem of said fruit to permit the same to pass through said apertures.

3. A fruit harvesting device comprising an elongated hollow body substantially rectangular in cross section and open at both ends and having top, bottom, and side walls, said top and side walls being imperforate and the bottom wall having an aperture adjacent the outer end thereof, an elongated tubular handle secured to the opposite end of said body, a hollow plunger slidably disposed in said body and comprising side, end and bottom walls, said plunger being open at the top, the bottom wall of said plunger having an aperture adjacent the outer end thereof, an actuating rod secured to the opposite end of said plunger and extending through said tubular handle and means on said body for detachably supporting a receptacle below the aperture in said body whereby fruit may be disposed in said plunger through the open top thereof and upon retraction of said plunger the edge of the outer end wall of said plunger will cooperate with an edge of said body to sever the stem of said fruit to permit the same to pass through said apertures.

4. A fruit harvesting device comprising an elongated hollow body substantially rectangular in cross section and open at both ends and having top, bottom and side walls, said top and side walls being imperforate and the bottom wall having an aperture adjacent the outer end thereof, an elongated tubular handle secured to the opposite end of said body, a hollow plunger slidably disposed in said body and comprising top, bottom and end walls, said plunger being open at both sides, the bottom wall of said plunger having an aperture adjacent the outer end thereof, an actuating rod secured to the opposite end of said plunger and extending through said tubular handle, hand engaging means on the free end of said actuating rod, tabs on said body and a receptacle detachably supported on said tabs below the aperture in said body whereby fruit may be disposed in said plunger through either open side thereof and upon retraction of said plunger the edge of the outer end wall of said plunger will cooperate with an edge of said body to sever the stem of said fruit to permit the same to pass through said apertures into said receptacle.

5. A fruit harvesting device comprising an elongated hollow body substantially rectangular in cross section and open at both ends and having top, bottom and side walls, said top and side walls being imperforate and the bottom wall having an aperture adjacent the outer end thereof, an elongated tubular handle secured to the opposite end of said body, a hollow plunger slidably disposed in said body and comprising top, bottom and end walls, said plunger being open at both sides, the bottom wall of said plunger having an aperture adjacent the outer end thereof, an actuating rod secured to the opposite end of said plunger and extending through said tubular handle, hand engaging means on the free end of said actuating rod and means on said body for detachably supporting a receptacle below the aperture in said body whereby fruit may be disposed in said plunger through either open side thereof and upon retraction of said plunger the edge of the outer end wall of said plunger will cooperate with an edge of said body to sever the stem of said fruit to permit the same to pass through said apertures.

6. A fruit harvesting device comprising an elongated hollow body substantially rectangular in cross section and open at both ends and having top, bottom and side walls, said top and side walls being imperforate and the bottom wall having an aperture adjacent the outer end thereof, an elongated tubular handle secured to the opposite end of said body, a hollow plunger slidably disposed in said body and comprising top, bottom and end walls, said plunger being open at both sides, the bottom wall of said plunger having an aperture adjacent the outer end thereof, an actuating rod secured to the opposite end of said plunger and extending through said tubular handle and means on said body for detachably supporting a receptacle below the aperture in said body whereby fruit may be disposed in said plunger through either open side thereof and upon retraction of said plunger the edge of the outer end wall of said plunger will cooperate with an edge of said body to sever the stem of said fruit to permit the same to pass through said apertures.

7. A fruit harvesting device comprising an elongated hollow body substantially rectangular in cross section and open at both ends and having top, bottom and side walls, said top and side walls being imperforate and the bottom wall having an aperture adjacent the outer end thereof, an elongated tubular handle secured to the opposite end of said body, a hollow plunger slidably disposed in said body and comprising at least a bottom wall and end walls, the bottom wall of said plunger having an aperture adjacent the outer end thereof, an actuating rod secured to the opposite end of said plunger and extending through said tubular handle, hand engaging means on the free end of said actuating rod, tabs on said body and a receptacle detachably supported on said tabs below the aperture in said body whereby fruit may be disposed in said plunger and upon retraction of said plunger the edge of the outer end wall of said plunger will cooperate with an edge of said body to sever the stem of said fruit to permit the same to pass through said apertures into said receptacle.

8. A fruit harvesting device comprising an elongated hollow body substantially rectangular in cross section and open at both ends and having top, bottom and side walls, said top and side walls being imperforate and the bottom wall having an aperture adjacent the outer end thereof, an elongated tubular handle secured to the opposite end of said body, a hollow plunger slidably disposed in said body and comprising at least a bottom wall and end walls, the bottom wall of said plunger having an aperture adjacent the outer end thereof, an actuating rod secured to the opposite end of said plunger and extending through said tubular handle, hand engaging means on the free end of said actuating rod and means on said body for detachably supporting a receptacle below the aperture in said body whereby fruit may be disposed in said plunger and upon retraction of said plunger the edge of the outer end wall of said plunger will cooperate with an edge of said body to sever the stem of said fruit to permit the same to pass through said apertures.

9. A fruit harvesting device comprising an elongated hollow body including a bottom wall and open at both ends, said body having an aperture in the bottom wall adjacent the outer end thereof, an elongated tubular handle secured to the opposite end of said body, a hollow plunger slidably disposed in said body and comprising at least a bottom wall and end walls, the bottom wall of said plunger having an aperture adjacent the outer end thereof, an actuating rod secured to the opposite end of said plunger and extending through said tubular handle and means on said body for detachably supporting a receptacle below the aperture in said body whereby fruit may be disposed in said plunger and upon retraction of said plunger the edge of the outer end wall of said plunger will cooperate with an edge of said body to sever the stem of said fruit to permit the same to pass through said apertures.

References Cited in the file of this patent

UNITED STATES PATENTS

| Number | Name | Date |
|---|---|---|
| 190,267 | Bevans | May 1, 1877 |
| 287,977 | Tabott | Nov. 6, 1883 |
| 337,168 | Langhorne | Mar. 2, 1886 |
| 1,012,977 | Bowen | Dec. 26, 1911 |
| 1,214,450 | Gifford | Jan. 30, 1917 |